United States Patent [19]

Dao-Trong

[11] Patent Number: 5,506,800
[45] Date of Patent: Apr. 9, 1996

[54] SELF-CHECKING COMPLEMENTARY ADDER UNIT

[75] Inventor: Son Dao-Trong, Stuttgart, Germany

[73] Assignee: International Business Machines Corporation, Armonk, N.Y.

[21] Appl. No.: 215,997

[22] Filed: Mar. 22, 1994

[30] Foreign Application Priority Data

Sep. 9, 1993 [EP] European Pat. Off. ............. 93114474

[51] Int. Cl.⁶ ............................. G06F 11/00; G06F 7/50
[52] U.S. Cl. .......................... 364/738; 364/740; 364/741; 364/788
[58] Field of Search .................................. 364/740, 741, 364/738, 737, 788

[56] References Cited

U.S. PATENT DOCUMENTS

| | | | |
|---|---|---|---|
| 3,986,015 | 10/1976 | Gooding et al. ................. | 235/153 BB |
| 4,982,357 | 1/1991 | Bechade ................................. | 364/788 |
| 5,018,093 | 5/1991 | Shih ....................................... | 364/740 |

OTHER PUBLICATIONS

IBM Technical Disclosure Bulletin, vol. 13, No. 6, Nov. 1970, "Checked Carry Select Adder", R. B. Freeman.
IBM Technical Disclosure Bulletin, vol. 7, No. 10, Mar. 1965, "Supplemented Parity Checking For A Binary Arithmetic Unit", S. F. Anderson.

*Primary Examiner*—Roy Envall
*Assistant Examiner*—Emmanuel L. Moise
*Attorney, Agent, or Firm*—Eugene I. Shkurko; Richard M. Goldman

[57] ABSTRACT

A self-checking complementary adder unit used for high performance subtractions comprises two carry select adders (30 and 36) each of which consists of a pair of byte or digit organized ripple carry adders (31, 32 and 37, 38) generating in parallel virtual sums from true and complemented operands based on the assumption that the carry-in signal is 1 or 0. Depending on byte or digit carry signals generated by carry look ahead circuits (33, 39), partial sums are selected from the virtual sums to form a real sum. The outputs of both carry select adders are connected to a multiplexer (42) which is controlled by the high order carry-out signal from one of the carry look ahead circuits representing the sign of a real sum. The multiplexer selects one of the real sums as the result of a subtraction. A sum checker compares cross-wise the parity bits of the virtual sums from both carry select adders and also compares the related carry-out signals from both the ripple carry adders and carry look ahead circuits. The compare results are combined by a logic circuit to generate a result check signal.

14 Claims, 4 Drawing Sheets

SELF-CHECKING COMPLEMENTARY ADDER UNIT

BACKGROUND OF THE INVENTION

The invention relates to a self-checking complementary adder unit for high performance subtractions from operands each consisting of a number of multibit digits and related parity bits.

DESCRIPTION O THE PRIOR ART

One of the critical factors of the performance of floating point processors is the fast execution of additions and subtractions. A suitable approach to meet the design requirements of such processor is the use of the carry select adder concept (U.S. Pat. No. 4,982,357). Carry select adders generate two preliminary sums, one of which is based on the assumption that there is a carryin to the operands and the other is based on the assumption that there is no carry-in. Depending on the byte carries produced during the additions, partial sums are selected from the preliminary sums to generate the real sum. The performance of such carry select adders may be increased by combining them with the well-known carry look ahead concept where the byte carries used to select the correct partial sums for being adopted into the real sum are produced by a carry look ahead circuit (IBM Technical Disclosure Bulletin, Vol. 30, No. 10, March 1988, pp. 331–334).

To execute fast subtractions two adders of this combined type may be used. The adders receive a common carry-in signal while one of the operands of each adder is complemented. Both adders perform subtractions by complementary additions, one generating the sum A+B+ 1 and the other the sum A+B+1. The sum with the positive sign is selected as the correct result without any need to subsequently recomplement the result. Adders operating in such manner are called complementary adders.

To check the correct operation of carry select adders a sum comparison circuit (U.S. Pat. No. 5,018,093) or a parity prediction tree may be used (IBM Technical Disclosure Bulletin, Vol. 13, No. 6, November 1970, pp. 1504–1505). It is also known to reduce the expenditure in checking the operation of carry select adders by a parity prediction for the preliminary results in a manner as used in incrementer and decrementer circuits (IBM Technical Disclosure Bulletin, Vol. 33, No. 1B, June 1990, p. 227). Such arrangement still requires a considerably expenditure in circuitry and processing time, in particular if applied to complementary adders.

SUMMARY OF THE INVENTION

According to the invention high-performance subtractions are achieved by two carry select adders operating as complementary adders. Each of the carry select adders comprises a pair of ripple carry adders which generate virtual sums based on assumed carry-in/no-carry-in conditions. In parallel, a carry look ahead circuit produces from the operands the real carry signals which are used to select from the virtual sums a number of partial sums to form the real sum. The carry select adders produce the differences A–B and B–A of operands which are transferred to the inputs of the adder in the true and complement representation. Depending on the sign of the result, one of these differences is selected as the result of the subtraction.

The selection of the appropriate difference is achieved by a multiplexer circuit which receives as control signal a high order carry from one of the carry look ahead circuits. Instead of using a parity prediction tree for checking the result, the invention provides for a cross-wise comparison of the parity signals of the virtual sums and simultaneously provide for a comparison of the carry signals generated in the carry look ahead circuits. This technique allows both an increased parallelism in the operation and a reduction of the expenditure in circuitry. The check signal is thus available almost at the same time as the result of the subtraction.

It is an object of the invention to provide a self-checking adder unit for high performance subtractions by using complementary adders.

A further object of the invention is to generate a check signal for the result by a small amount of circuits within approximately the same time period as the result is generated.

Figure 1:
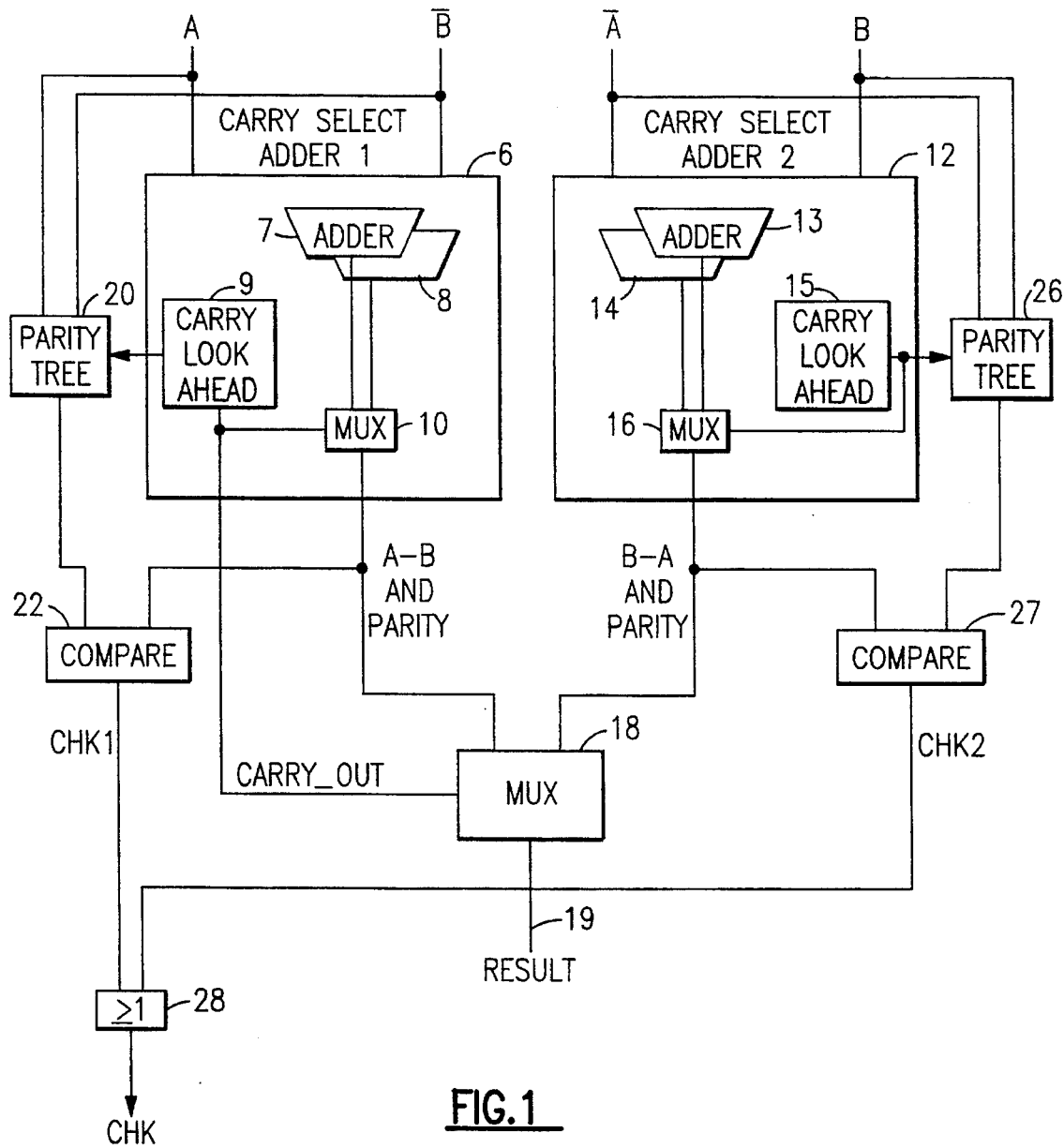
FIG. 1 shows a block diagram of complementary adders as used by the invention.

An implementation example of the invention is subsequently described by reference to the drawings.

DETAILED DESCRIPTION OF THE DRAWINGS

To facilitate the understanding of the invention the principle of using carry select adders as complementary adders for performing subtractions is explained with reference to FIG. 1. This figure shows carry select adders 6 and 12 each of which comprises two ripple carry adders 7, 8 and 13, 14. These adders are arranged to process four (or more) operand bytes each representing two binary coded digits. Carry select adder 6 and 12 also comprises a carry look ahead, circuit 9 and 15, respectively, which generates from the operands carry signals in parallel to the operation of the ripple carry adders 7, 8 and 13, 14. Multiplexer circuits 10 and 16 are connected to the sum outputs of the adders 7, 8 and 13, 14, respectively. Multiplexer circuit 10 is controlled by the carry signals from the carry look ahead circuit 9 to gate partial sums from the adders 7 or 8 to the output bus of the carry select adder 6. Accordingly, multiplexer circuit 16 is controlled by the carry signals from carry look ahead circuit 15 to perform a similar selection of partial sums from the adders 13 or 14. The carry select adder 6 receives the operands A and B and generates the difference A–B or, in case of an addition, it receives the operands A and B to form the sum A+B. The carry select adder 12 receives the operands $\overline{A}$ and B, and produces the difference B–A. The output busses of the carry select adders 6 and 12 are connected to a multiplexer circuit 18 which is controlled by a carry signal of the highest digit order from the carry look ahead circuit 9. If this carry signal is 1, multiplexer 18 is conditioned to gate the result A–B of the first carry select adder 6 to the output bus 19 while a carry signal 0 conditions the multiplexer to select the result B–A of the carry select adder 12 to be transferred to the output bus 19. The operation of the adders 7, 8 is explained in more detail by the following example presented in decimal digits.

| A = | 53 | 76 | 27 | 63 | |
|---|---|---|---|---|---|
| B = | 22 | 56 | 43 | 52 | |
| The adders 7 and 8 generate partial result bytes each representing two digits: | | | | | |
| carry = 0 results of | 75 | (32) | 70 | (15) | partial adder 7 |
| carry = 1 results of | (76) | 33 | (71) | 16 | partial adder 8 |
| carry-look-ahead -> | 1 | 0 | 1 | 0 | |
| A + B = | 76 | 32 | 71 | 15 | result |

Figure 2:
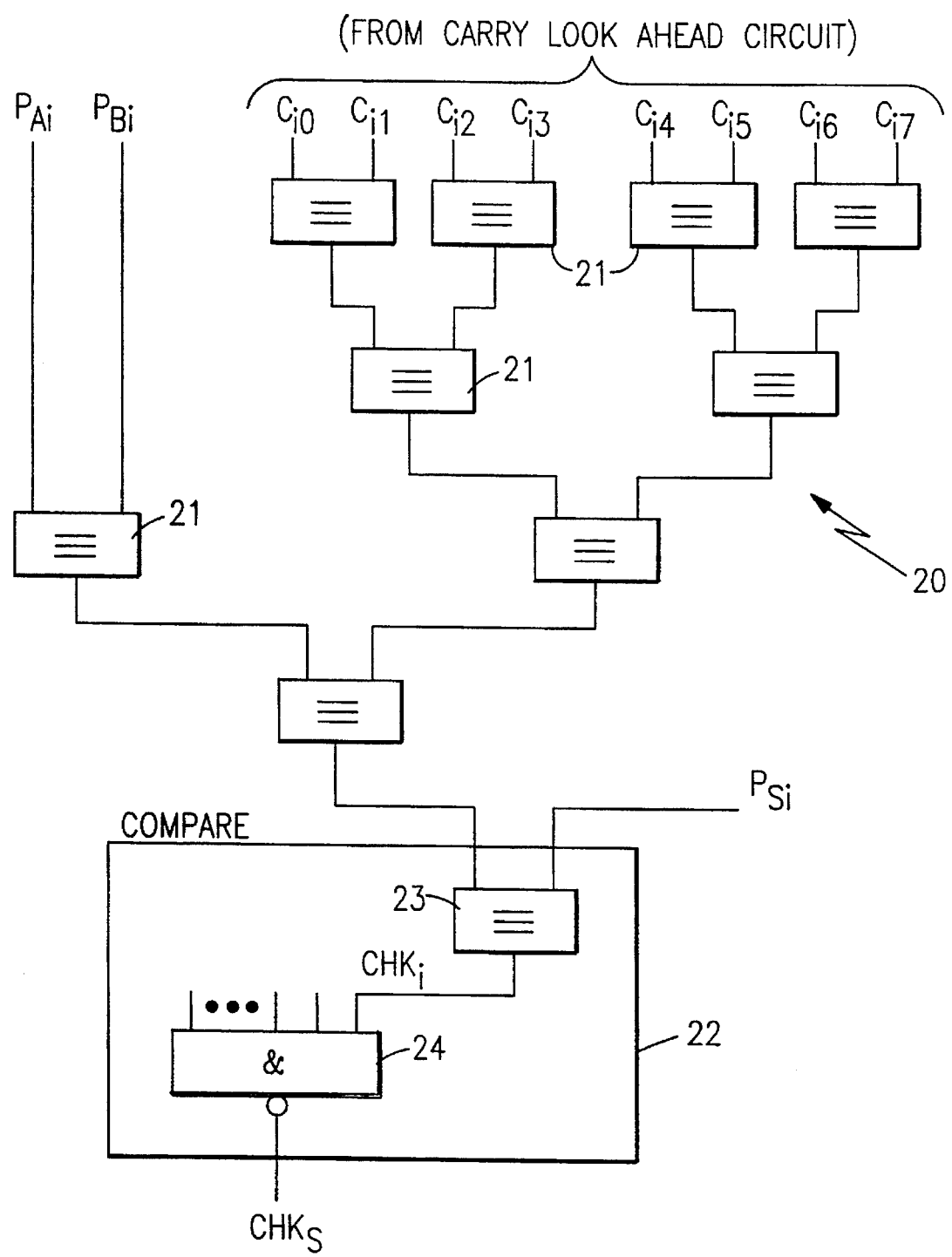
FIG. 2 shows a conventional parity prediction tree which is part of the adder unit shown in FIG. 1.

The parity bits of this result are checked in parallel to the operation of the adders 7, 8 by a parity prediction circuit 20 which is a tree of equivalence circuits 21 as shown in FIG. 2. The input signals of this tree are the carry signals $C_{i0}$ to $C_{i7}$ of the bit positions 0 to 7 of byte i resulting from the operation of the carry look ahead circuit 9. Furthermore, the tree receives the parity bits $P_{Ai}$ and $P_{Bi}$ of byte i in the operands A and B. By the operation of a compare circuit 22 the output of the tree 20 is compared with the parity bits $P_{Si}$ of the sum S=A+B to generate a check signal. This is shown for the byte i in FIG. 2. By means not shown, the parity bit $P_{Si}$ of byte i is generated in the adder 6 and is part of the result selected by the multiplexer circuit 10. The comparison is performed by an equivalence circuit 23 which delivers the check signal $CHK_i$ of byte i. The signal $CHK_i$ of all bytes are combined by a NAND-circuit 24 to generate a common check signal $CHK_S$ for the result selected by multiplexer circuit 10. If the signal $CHK_S$ is zero the sum result is correct while if it is one it indicates that the sum result byte includes an error.

If the adders 7, 8 are duplicated, as shown by adders 13, 14 in FIG. 1, it is possible to use the sign of the result to select the correct result of a subtraction. Hereby a subtraction is performed by the well-known principle of adding the complement of the operand to be subtracted. This is shown by the following example.

```
A = 5 3 7 6 2 7 6 3
B = 2 2 5 6 4 3 5 2
A - B = 3 1 1 9 8 4 1 1   positive sign → will be selected
B - A = -6 8 8 0 1 5 8 9  negative sign
```

In this manner the correct result is generated without an additional recomplementing cycle. Such dual adder arrangement is called complementary adders. The carry select adders 6 and 12 in FIG. 1 have the function of complementary adders. They receive a common carry-in signal. In both adders one operand is true and the other is complemented according to the following:

Adder 1: $S_1 = A + \bar{B} + C_i$

Adder 2: $S_2 = \bar{A} + B + C_i$

The selection among the results depends on the high position byte carry-out by the carry look ahead circuit 9. If this carry-out is 1, the result of the carry select adder 6 is gated to the output bus 19 by the operation of the multiplexer circuit 18. If on the other hand the carry-out is 0, the sum in the carry select adder 12 is gated to bus 19.

In this arrangement checking of the result may be performed by separate parity prediction trees and subsequent comparison of the predicted parity with the parity bits of the sum. Thus, carry select adder 12 is connected with a parity tree 26 which corresponds to parity tree 20. A compare circuit 27 fulfills for the adder 12 the same function as the compare circuit 22 does for the adder 6. The output signals of the compare circuits 22 and 27 are combined by an OR circuit 28 to generate a check signal for the difference result generated on output bus 19.

Figure 3:
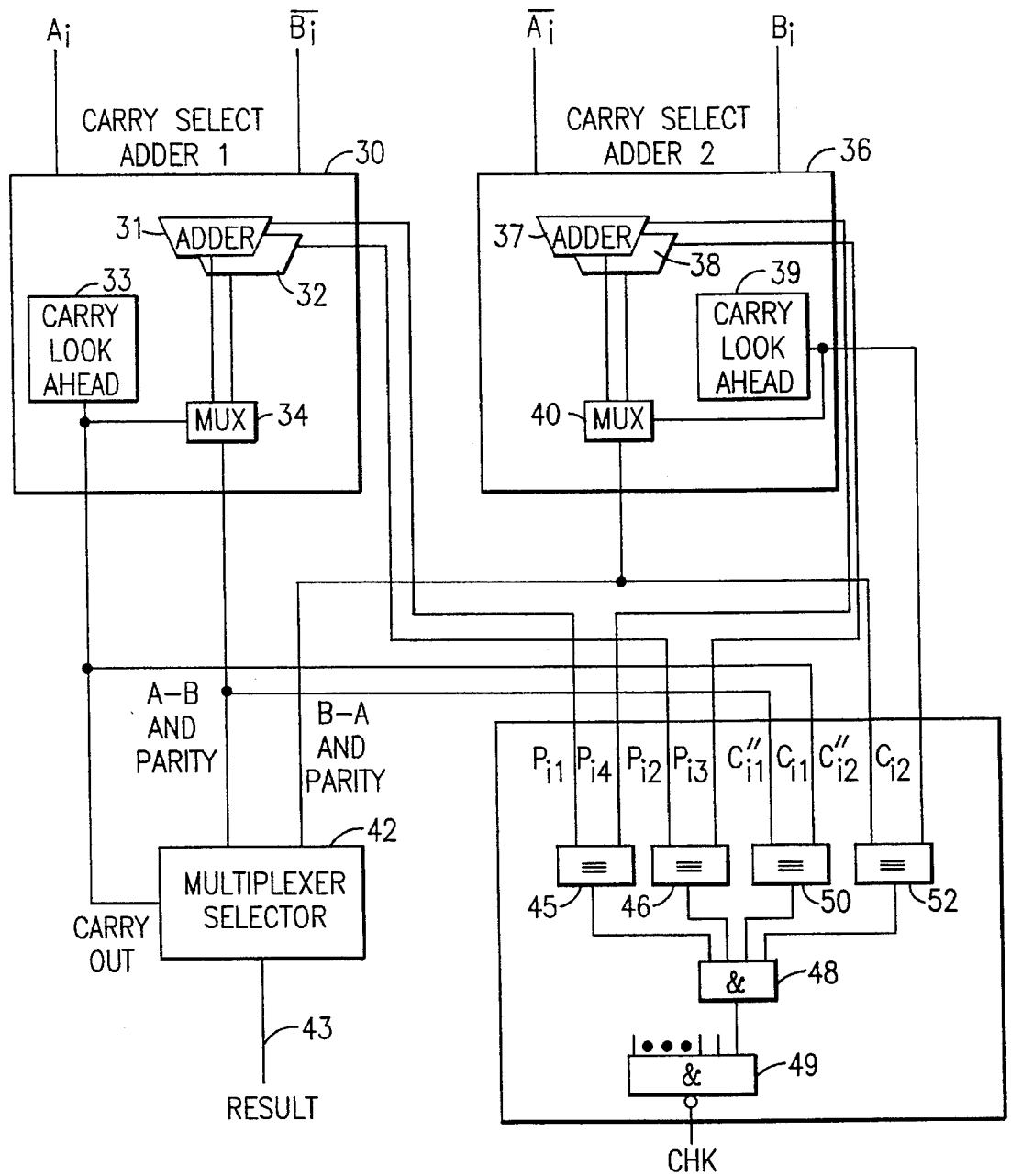
FIG. 3 shows a block diagram of an implementation of the invention including complementary adders and a check logic.

The unit shown in FIG. 3 uses the complementary adder concept shown in FIG. 1. A carry select adder 30 which corresponds to carry select adder 6 comprises ripple carry adders 31 and 32, a carry look ahead circuit 33 and a multiplexer circuit 34. A carry select adder 36 which corresponds to carry select adder 12 comprises adders 37 and 38, a carry look ahead circuit 39 and a multiplexer circuit 40. The output busses of the adders 30 and 36 are connected to a multiplexer circuit 42 which corresponds to multiplexer 18 and which is connected to an output bus 43 of the adder unit. The function of these circuits in generating a difference result corresponds to that described in connection with FIG. 1.

The checking of such result takes place by means of a compare logic 44 which is based on the following considerations. Since there are two complementary adders each consisting of a carry select adder there exist four parity bits for each partial addition.

$$P1 = P(a + b + 1) \quad\quad P(x): \text{Parity bit of } x \quad\quad (1)$$
$$P2 = P(a + \bar{b} + 0) \quad\quad a, b: \text{partial operand}$$
$$P3 = P(\bar{a} + b + 1)$$
$$P4 = P(\bar{a} + b + 0)$$

Applying the complement law results in:

$$-a = \bar{a} + 1$$

$$\bar{a} = -a - 1$$

A corresponding application to the equation (1) lead to the following:

$$\begin{aligned}(a + \bar{b}) &= -(a + b) - 1 \\ &= -a - b - 1 \\ &= \bar{a} + 1 + \bar{b} + 1 - 1 \\ &= \bar{a} + \bar{b} + 1 \quad\quad \to P2 = P3\end{aligned} \quad (2)$$

(if the number of operand bits is even: $P(x) = P(\bar{x})$ )

$$\begin{aligned}(a + \bar{b} + 1) &= -(a + b + 1) - 1 \\ &= -a - b - 1 - 1 \\ &= \bar{a} + 1 + \bar{b} + 1 - 1 - 1 \\ &= \bar{a} + \bar{b} \quad\quad \to P1 = P4\end{aligned} \quad (3)$$

In the carry select adder 30 the adder 31 is considered to be the first adder generating a first virtual sum and related parity bits $P_{i1}$ and adder 32 is considered to be the second adder generating a second virtual sum and related parity bits $P_{i2}$ wherein i designates the bytes of the virtual sums. Accordingly, in the carry select adder 36 the adder 37 is considered to be a third adder generating a third virtual sum and related parity bits $P_{i3}$ and the adder 8 is considered to be the fourth adder generating a fourth virtual sum and related parity bits $P_{i4}$. Based on this assignment, the equations (2) and (3) indicate that a check of the results generated by the carry select adders 30 and 36 may be performed in correspondence with equation (2) by comparing the parity bits $P_{i2}$ of the second virtual sum produced by adder 32 with the parity bits $P_{i3}$ of the third virtual sum produced by adder 37, and, in correspondence with equation (3) by comparing the parity bits $P_{i1}$ of the first virtual sum produced by adder 31 with the parity bits $P_{i4}$ of the fourth virtual sum produced by adder 38. In this check are also involved the carry-in bits $C_{i1}$ and $C_{i2}$ produced by the carry look ahead circuits 33 and 39. The carry-out bits $C_{i1}$ and $C_{i2}$ are compared with the real carry-out bits $C''_{i1}$ and $C''_{i2}$ from the adders 30 and 36, respectively, where i designates the partial result bytes to which the carry signals are related. These comparisons are performed in the compare logic 44 which comprises equivalence circuits 45, 46, 50 and 52 arranged in parallel. The output signals of the latter circuits are combined by AND-circuit 48. A NAND-circuit 49 combines the output signals from the AND-circuits 48 of all byte positions of the adder unit of FIG. 3 to a check signal CHK which serves as indication that the result appearing on bus 43 includes an error. This is not the case, i.e. the result is correct, if all AND-circuits 48 indicate an equal condition in the preceding equivalence circuits. In such case the signal level at the output 50 of NAND-circuit 49 is low indicating that the result on bus 43 is correct. The check operation takes place in parallel to the selection of the real sum by the operation of the multiplexer circuits 34, 40 and 42.

Figure 4:
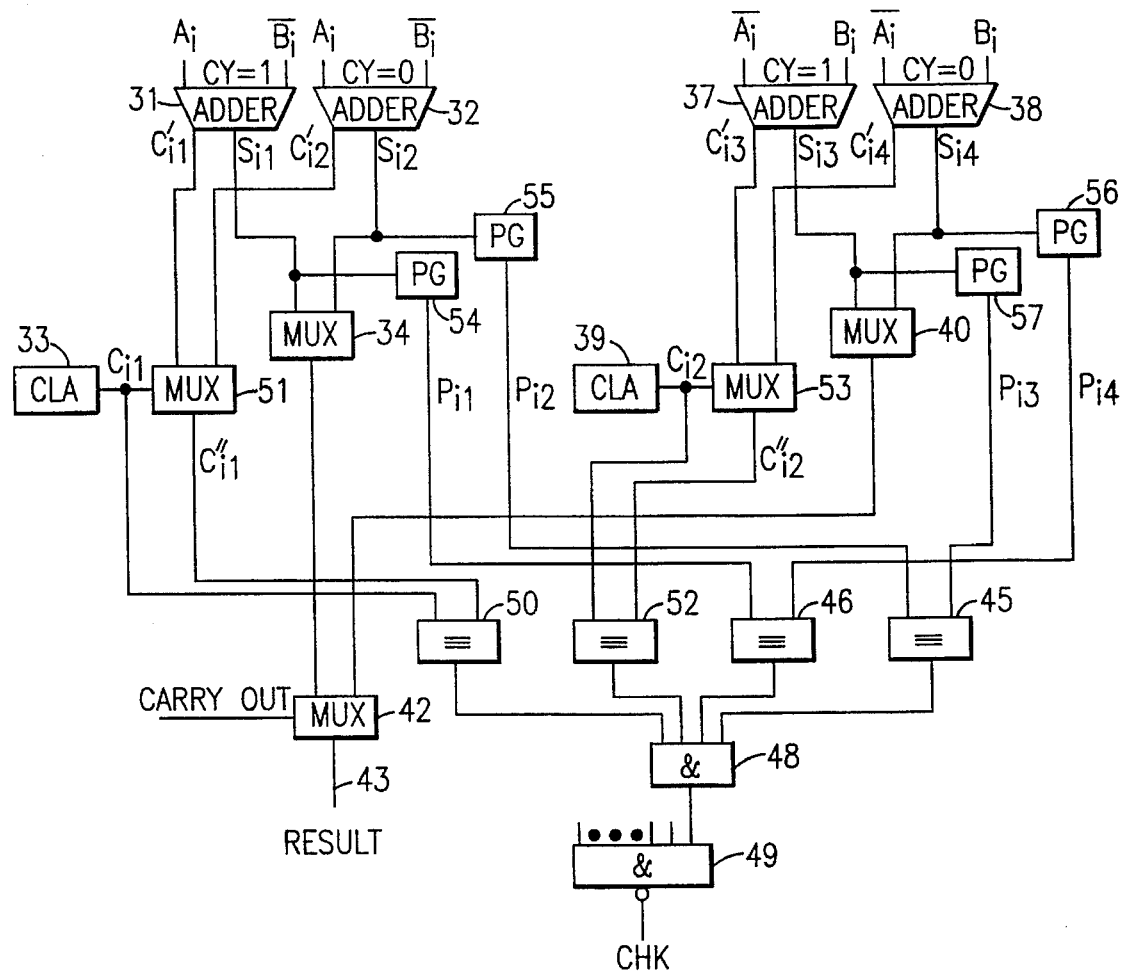
FIG. 4 shows a byte segment of the adder unit of FIG. 3 in more detail.

FIG. 4 shows a more detailed representation of one byte segment of the adder unit of FIG. 3. Components shown in FIG. 4 which correspond to components of FIG. 3 are designated by the same reference numbers. It should, however, be noted that in FIG. 4 these components are reduced to a one byte segment. The operands $A_i$, $\overline{A}_i$, $B_i$ and $\overline{B}_i$ represent one byte each. The sum signals $S_{i1}$, $S_{i2}$, $S_{i3}$, $S_{i4}$ represent the outputs of the one byte wide ripple carry adders 31, 32 and 37, 38. The carry-out signals $C'_{i1}$, $C'_{i2}$, $C'_{i3}$ and $C'_{i4}$ are those of the highest bit positions of these adders. The carry signals $C_{i1}$ and $C_{i2}$ are generated by the carry look ahead circuits 33 and 39 and indicate a carry-out status for the byte segment shown. An equivalence circuit 50 compares the carry signal $C_{i1}$ from carry look ahead circuit 33 with the carry signals $C'_{i1}$ or $C'_{i2}$ which are gated through a multiplexer 51 controlled by the carry $C_{i1}$ and which are designated $C''_{i1}$. Usually this comparison will result in an equal condition. A not-equal output of circuit 50 would be an indication for a hardware fault. A multiplexer 53 and equivalence circuit 52 perform a corresponding check for the adders 37, 38 by comparing the carry signals $C'_{i3}$ or $C'_{i4}$ with the carry signal $C_{i2}$ of the carry look ahead circuit 39. The equivalence circuits 50 and 52 correspond to the equivalent circuit 47 in FIG. 3. Parity generators 54 and 55 produce the parity bits and $P_{i2}$ of the partial sums $S_{i1}$ and $S_{i2}$ from the adders 31 and 32. These signals are the one-side input of the equivalence circuits 46 and 45 which, respectively, receive another input from corresponding parity generators 56 and 57 producing the parity bits $P_{i3}$ and $P_{i4}$ of the partial sums $S_{i3}$ and $S_{i4}$ from the adders 37 and 38. The equivalence circuits 45, 46, 50 and 52, the AND-circuit 48 and the NAND-circuit 49 perform the check operation for the result byte appearing at the output of multiplexer 42. Since these circuits are arranged in parallel to the multiplexer circuits 34, 40 and 42 and are operating simultaneously to them, the check signal CHK is available almost at the same time as the result on output bus 43.

Alternative Embodiments

The invention is not restricted to the implementation example shown in FIGS. 3 and 4. Various modifications in the organization and circuitry are possible. For example, the byte organization of the complementary adders 30 and 36 and of the related circuits may be replaced by a digit organization, i.e. by generating and checking the parity of each four bit digit. In such case the signals $A_i$, $B_i$, $S_{i1}$ to $S_{i4}$, $C_{i1}$, $C_{i2}$ and $C'_{i1}$ to $C'_{i4}$ represent or are assigned to the digits of the operands, the partial results and the total result.

We claim:
1. A self-checking complementary adder unit for high performance subtractions from operands comprising a number of multibit digits and related parity bits, the adder unit comprising:
 a) two carry select adders (30, 36) each of the two carry select adders including a carry look ahead circuit (33 and 39), a multiplexer (34 and 40), and a pair of ripple carry adders (31, 32 and 37, 38), where said ripple carry adders (31, 32) of the first carry select adder (30) generate a first virtual sum from a true operand A, a complemented operand B and an assumed low order carry-in signal and generate a second virtual sum from the operands A and B and an assumed low order non-carry-in signal, and where said ripple carry adders (37, 38) of the second carry select adder (36) generate a third virtual sum from a complemented operand A, a true operand B and an assumed low order carry-in signal and generate a fourth virtual sum from the complemented operand A and the true operand B and an assumed low order non-carry-in signal;
 b) wherein the two carry look ahead circuits (33 and 39) are each connected to one of the carry select adders to generate carry signals ($C_{i1}$ and $C_{i2}$) of predetermined bit segments for controlling the multiplexer circuits (34 and 40) which select from the virtual sums partial sums to form two real sums A+B, where A is the true operand A of the first virtual sum and B is the complemented operand B of the first virtual sum, and B+A, where B is the true operand B of the third virtual sum and A is the complemented operand A of the third virtual sum;
 c) a multiplexer circuit (42) connected to outputs of both carry select adders (30, 36) and controlled by a sum sign representing a high position carry-out signal from one of the carry look ahead circuits (33 or 39) to select one of the real sums, A−B or B−A, as an actual result; and
 d) result check means (44) for comparing the parity bits ($P_{i1}$) of the first virtual sum from the first carry select adder (30) with the parity bits ($P_{i4}$) of the fourth virtual sum from the second carry select adder (36), for comparing the parity bits ($P_{i2}$) of the second virtual sum from the first carry select adder with the parity bits ($P_{i3}$) of the third virtual sum from the second carry select adder (36), and for comparing the bit segment carry signals ($C_{i1}$ and $C_{i2}$) generated by said two carry look ahead circuits (33 and 39), said result check means including a compare result combining circuit (48+49) to form a check signal (CHK) for confirming correctness of a total result or for indicating an error.

2. An adder unit according to claim 1, wherein said result check means (44) is connected in parallel to a partial sum selection and result selection means (34, 40 and 42) for generating the check signal (CHK) simultaneously with a generation of the actual result.

3. An adder unit according to claim 2, wherein said result check means (44) further includes a first equivalence circuit (45) for comparing the parity bits ($P_{i1}$) of the first virtual sum with those of the fourth virtual sum, a second equivalence circuit (46) for comparing the parity bits ($P_{i2}$) of the second virtual sum with those of the third virtual sum, and third and fourth equivalence circuits (50, 52) comparing the carry signals from the carry look ahead circuit (33) of the first carry select adder (30) with those from the ripple carry adders (31 or 32) of the same carry select adder (30) and comparing the carry signals from the carry look ahead circuit (39) of the second carry select adder (36) with those from the ripple carry adders (37, 38) of the same carry select adder (36), and wherein all said equivalence circuits are multibit equivalence circuits connected in parallel to each other.

4. An adder unit according to claim 3, wherein said result check means (44) further includes three level logic, a first level of said three level logic comprising said equivalence circuits (45, 46, 50, 52) connected in parallel to each other, a second level of said three level logic comprising AND-circuits (48) connected to the outputs of said equivalence circuits, and a third level of said three level logic comprising NAND-circuits connected to outputs of said AND-circuits.

5. An adder unit according to claim 4, wherein said bit segments represent digits each of which is connected with a parity bit, the carry ripple adders (31, 32, 37, 38) and the multiplexer circuits (34, 40, 42) are digit organized, said carry look ahead circuits (33, 39) generate in parallel carry signals for all digits, and said sum check means (44) includes a compare circuit for each digit.

6. An adder unit according to claim 4, wherein said bit segment carry signals are bytes each of which is connected with a parity bit, the carry ripple adders (31, 32, 37, 38) and the multiplexer circuits (34, 40, 42) are byte organized, the carry look ahead circuits (33, 39) generate in parallel carry signals for all bytes, and said sum check means (44) includes a compare circuit for each byte.

7. An adder unit according to claim 1, wherein said result check means (44) further includes a first equivalence circuit (45) for comparing the parity bits (i1) of the first virtual sum with those of the fourth virtual sum, a second equivalence circuit (46) for comparing the parity bits ($P_{i2}$) of the second virtual sum with those of the third virtual sum, and a third equivalence circuit (47) comparing the carry signals from the first carry look ahead circuit (33) with those of the second carry look ahead circuit (39), and wherein said equivalence circuits are multibit equivalence circuits connected in parallel to each other.

8. An adder unit according to claim 7, wherein said result check means (44) further includes for each bit segment two multibit equivalence circuits (50, 52), a first of said multibit equivalence circuits (50) for comparing bit segment carry-out signals of the ripple carry adders (31, 32) of the first carry select adder (30) with bit segment carry signals from the first carry look ahead circuit (33), and a second of said multibit equivalence circuits (52) for comparing bit segment carry-out signals of the ripple carry adders (37, 38) of the second carry select adder (36) with bit segment carry signals from the second carry look ahead circuit (39), wherein multiplexer circuits (51 and 53) are connected between said equivalence circuits (50 and 52) and the bit segment carry outputs of said ripple carry adders (31, 32 and 37, 38), and wherein said bit segment carry signals from said carry look ahead circuits (33 and 39) serve as control signals for corresponding multiplexer circuits (51 and 53) which select the carry-out signals of the real sums selected.

9. An adder unit according to claim 1, wherein said result check means (44) further includes for each bit segment two multibit equivalence circuits (50, 52), a first of said multibit equivalence circuits (50) for comparing bit segment carry-out signals of the ripple carry adders (31, 32) of the first carry select adder (30) with bit segment carry signals from the first carry look ahead circuit (33), and a second of said multibit equivalence circuits (52) for comparing bit segment carry-out signals of the ripple carry adders (37, 38) of the second carry select adder (36) with bit segment carry signals from the second carry look ahead circuit (39), wherein multiplexer circuits (51 and 53) are connected between said equivalence circuits (50 and 52) and the bit segment carry outputs of said ripple carry adders (31, 32 and 37, 38), and wherein said bit segment carry signals from said carry look ahead circuits (33 and 39) serve as control signals for corresponding multiplexer circuits (51 and 53) which select the carry-out signals of the real sums selected.

10. An adder unit according to claim 9, wherein said compare result combining circuit comprises:

AND-circuits (48) connected to an output of said equivalence circuits; and

NAND-circuits (49) generating a check signal from output signals of said AND-circuits.

11. An adder unit according to claim 1, wherein said compare result combining circuit comprises:

AND-circuits (48) connected to an output of said equivalence circuits; and

NAND-circuits (49) generating a check signal from output signals of said AND-circuits.

12. An adder unit according to claim 11, wherein said result check means (44) further includes three level logic, a first level of said three level logic comprising said equivalence circuits (45, 46, 50, 52) connected in parallel to each other, a second level of said three level logic comprising said AND-circuits (48), and a third level of said three level logic comprising said NAND-circuits.

13. An adder unit according to claim 1, wherein said bit segment carry signals represent digits each of which is connected with a parity bit, the carry ripple adders (31, 32, 37, 38) and the multiplexer circuits ( 34, 40, 42 ) are digit organized, said carry look ahead circuits (33, 39) generate in parallel carry signals for all digits, and said sum check means (44) includes a compare circuit for each digit.

14. An adder unit according to claim 1, wherein said bit segment carry signals are bytes each of which is connected with a parity bit, the carry ripple adders (31, 32, 37, 38) and the multiplexer circuits (34, 40, 42) are byte organized, the carry look ahead circuits (33, 39) generate in parallel carry signals for all bytes, and said sum check means (44) includes a compare circuit for each byte.

* * * * *